United States Patent [19]

Hardtmann

[11] 3,920,648
[45] Nov. 18, 1975

[54] HYPOLIPIDEMIC 5-PHENYL-2-OXYACETIC AND 2-MERCAPTOACETIC ACIDS AND ESTERS

[75] Inventor: Goetz E. Hardtmann, Florham Park, N.J.

[73] Assignee: Sandoz, Inc., E. Hanover, N.J.

[22] Filed: June 8, 1973

[21] Appl. No.: 368,366

[52] U.S. Cl............................... 260/251 R; 424/251
[51] Int. Cl............................................. C07d 51/36
[58] Field of Search .................................. 260/251 R

[56] References Cited
UNITED STATES PATENTS 3,300,495  1/1967  Perina et al.......................... 260/251
3,814,761  6/1974  Santilli et al. ................. 260/256.5 R Primary Examiner—Donald G. Daus
Assistant Examiner—Raymond V. Rush
Attorney, Agent, or Firm—Gerald D. Sharkin; Richard E. Vila

[57] ABSTRACT

Disclosed are compounds of the formula:

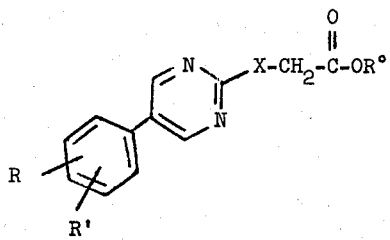

wherein X is oxygen or sulfur, $R^0$ is hydrogen or alkyl of 1 to 4 carbon atoms, and R and R' are hydrogen, halo, alkyl or alkoxy. The compounds are useful as hypolipidemic agents and prepared by reacting the corresponding 2-halo-5-phenylpyrimidine with a compound of the formula $HXCH_2COOR$.

9 Claims, No Drawings

HYPOLIPIDEMIC 5-PHENYL-2-OXYACETIC AND 2-MERCAPTOACETIC ACIDS AND ESTERS

This invention relates to compounds having pharmacological activity and useful, for example, as hypolipidemic agents, and to pharmaceutical methods and compositions utilizing such compounds.

The compounds of the invention are represented by the following formula I:

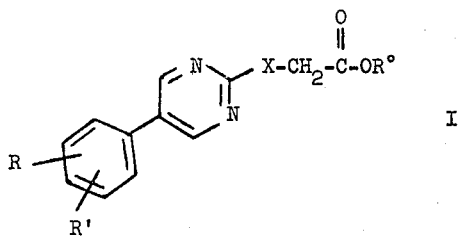

wherein:
X is oxygen or sulfur,
R° is hydrogen or alkyl of 1 to 4 carbon atoms, and
R and R' are, independently, hydrogen, halo of atomic weight of from 18 to 80, alkyl of 1 to 4 carbon atoms or alkoxy of 1 to 4 carbon atoms.

The compounds of the formula I may be prepared by reacting a compound of the formula II

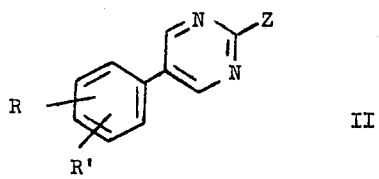

in which Z is chloro or bromo and R and R' are as defined, with a compound of the formula III

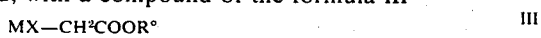

in which M is hydrogen or a metal cation, preferably an alkali metal cation, and R° is as defined.

The reaction of compound II and III is conducted in a known manner, desirably in a suitable inert solvent of conventional type, e.g., benzene, and at temperatures typically of from 20°C. to 120°C., more usually 40°C. to 100°C. When compounds III having M = H are employed, the reaction is desirably conducted in the presence of a strong base, preferably a strong inorganic base.

The compounds I in which R° is hydrogen are, however, preferably prepared from the corresponding compounds I in which R° is alkyl in a known manner, for example, by saponification involving treatment of the ester with a strong base followed by neutralization with a strong acid. Such hydrolysis reactions are suitably conducted in a liquid medium, e.g., a mixture of water and a lower alcohol, at temperatures typically in the range of from 0°C. to 120°C., more suitably 15°C. to 60°C.

The compounds of the formula II and III are either known per se or may be prepared in a known manner from known materials. The compounds II may be prepared, for example, by reacting a compound IV

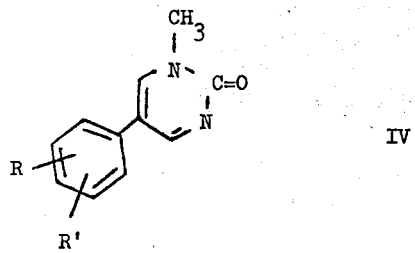

with phosphorus oxychloride and phosphorus pentachloride at elevated temperatures, e.g., 50°C. to 150°C.

The preferred compounds I from the standpoint of pharmacological activity have one or more of the following features: a) X equal sulfur; (b) R° equal hydrogen; and (c) one of R and R' equal hydrogen, more preferably both R and R' equal hydrogen.

The compounds of formula (I) are useful because they possess pharmacological activity in animals. In particular, the compounds I are useful as hypolipidemic agents, more particularly as hyperlipoproteinemic agents, as indicated by the fall of cholesterol and/or triglyceride levels in the male albino Wistar rats weighing 110–130 g. initially. The rats are maintained on drug-free laboratory chow diets for 7 days and then divided into groups of 8 to 10 animals. Each group with the exception of the control is then given typically 20–50 milligrams per kilogram of body weight per diem of the compound orally for 6 days. At the end of this period, the animals are anethetized with sodium hexobarbital and bled from the carotid arteries. Serum or plasma samples are collected, and 1.0 ml. samples of the serum are added to 9.0 ml. redistilled isopropanol. Two autoanalyzer cupsful of a mixture of zeolitecopper hydroxide and Lloydds reagent (Kessler, E., and Lederer, H., 1965, Technicon Symposium Mediad Inc., New York, (345–347) are added, and the mixture is shaken for one hour. Cholesterol and triglyceride levels are determined simultaneously on the same sample by Technicon N 24 A (Cholesterol) and N-78 (triglyceride) methodology. The mean total serum cholesterol levels are then computed and the hypocholesterolemic activity is expressed as the fall in cholesterol levels as a percentage of the control level. The change in serum triglyceride levels induced by the drug is computed as a percentage of the control triglyceride levels.

For such usage, the compounds (I) may be combined with a pharmaceutically acceptable carrier or adjuvant and may be administered orally or parenterally as such or admixed with conventional pharmaceutical carriers. They may be administered in such forms as tablets, dispersible powders, granules, capsules, syrups and elixirs and parenterally as solutions, suspensions, dispersions, emulsions and the like, e.g., a sterile injectable aqueous solution. The dosage will vary depending upon the mode of administration utilized and the particular compound employed.

For the above usage, the compounds may be administered orally as such or admixed with conventional pharmaceutical carriers. The dosage administered may vary depending on the particular compound employed, the therapy desired and the severity of the condition being treated. In general, satisfactory results are obtained when administered orally at a daily dosage of from about 3 milligrams to about 200 milligrams per kilogram of animal body weight, preferably given in divided doses, 2 to 4 times a day, or in sustained release form. For most mammals the total oral daily dosage is from about 200 grams to about 3000 grams of the compound, and the dosage forms suitable for internal use comprise from about 50 milligrams to about 1500 milligrams of active compound in intimate admixture with a solid or liquid pharmaceutically acceptable carrier or diluent.

The preferred pharmaceutical compositions from the standpoint of preparation and ease of administration are solid compositions, particularly hardfilled capsules and tablets containing from about 100 to 600 milligrams of the active ingredient.

A representative formulation suitable for administration is a tablet or capsule containing the ingredients indicated below which may be prepared by conventional techniques and are useful as a hypocholesterolemic agent at a dose of one tablet or capsule 2 to 4 times a day.

| Ingredient | Weight (mg.) | |
|---|---|---|
| | tablet | Capsule |
| 5-phenyl-pyrimidine-2-mercaptoacetic acid. | 250 | 250 |
| Tragacanth | 10 | — |
| Lactose | 247.5 | 250 |

EXAMPLE 1

5-Phenyl-pyrimidine-2-mercaptoacetic acid ethyl ester.

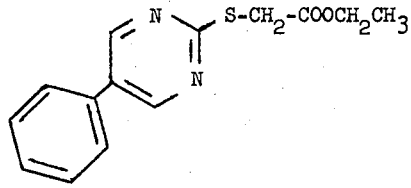

STEP A: Preparation of 2-chloro-5-phenyl-pyrimidine.

A pasty mixture of 26.7 g. of 1-methyl-5-phenyl-2(1H) pyrimidone, 6.5 g. of phosphorus pentachloride and 55 ml. of phosphorus oxychloride are heated at 70°C. for 5 minutes, after which the temperature is raised to 120°C. and maintained at this temperature for 3 hours. The resulting solution is cooled, most of the phosphorus oxychloride is evaporated in vacuo and the residue cooled to −70°C. At this temperature ice and water are added. On scratching crystallization occurs. The solids are filtered off, washed with water and dried to obtain 2-chloro-5-phenyl-pyrimidine, m.p. 122–125°C.

STEP B: Preparation of 5-phenyl-pyrimidine-2-mercaptoacetic acid ethyl ester.

To 10.5 g. of ethyl-2-mercaptoacetate in 200 ml. anhydrous benzene is added portionwise, 4.5 g. of sodium hydride (57% in mineral oil, washed with benzene). The mixture is stirred for 30 minutes at room temperature after which period 15 g. of -chloro-5-phenyl-pyrimidine is added and the resulting mixture is heated at 60°C. for 24 hours. After cooling the mixture is extracted 3 times with 100 ml. of water (ice cold) and once with saturated sodium chloride solution. the organic phase is then dried, filtered and partially (about 50 ml.) evaporated in vacuo. On addition of ether and after standing, the resulting crystals are filtered off and dried to obtain 5-phenyl-pyrimidine-2-mercaptoacetic acid ethyl ester, m.p. 54–57°C.

EXAMPLE 2

Following the procedure of Example 1, the following additional compounds of the invention are prepared.
a. 5-phenyl-pyrimidine-2-mercaptoacetic acid isopropyl ester.
b. 5-phenyl-pyrimidine-2-oxyacetic acid ethyl ester, m.p. 72–75°C.
c. 5-(4-chlorophenyl)-pyrimidine-2-mercaptoacetic acid ethyl ester.
d. 5-(3',4'-dimethoxyphenyl)-pyrimidine-2-mercaptoacetic acid ethyl ester.
e. 5-(4'-chlorophenyl)-pyrimidine-2-oxyacetic acid ethyl ester.

EXAMPLE 3

5-Phenyl-pyrimidine-2-mercaptoacetic acid

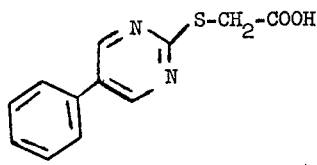

An amount of 7.5 g. of 5-phenyl-pyrimidine-2-mercaptoacetic acid ethyl ester is dissolved with heating in 250 ml. of ethanol. After cooling, 37.5 ml. 1N. sodium hydroxide are added and the mixture is stirred for 1½ hours at room temperature. The solvent is evaporated in vacuo, and the residue is dissolved into water. On addition of 2N hydrochloric acid (to pH 7) the desired acid precipitates. The crystaline material is filtered, washed thoroughly with water, methanol and ether and dried in vacuo to obtain 5-phenyl-pyrimidine-2-mercaptoacetic acid, m.p. 177–180°C.

EXAMPLE 4

Following the procedure of Example 3, the following additional compounds of the invention are prepared:
A. 5-phenyl-pyrimidin-2-oxyacetic acid, m.p. 190–194°C.(decomp.).
B. 5-(4-chlorophenyl)-pyrimidine-2-mercaptoacetic acid.

What is claimed is:
1. A compound of the formula:

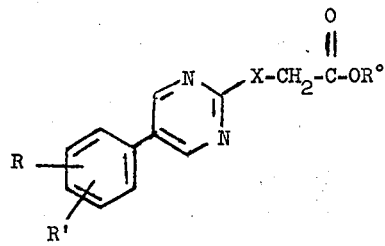

wherein:
X is oxygen or sulfur,
$R°$ is hydrogen or alkyl of 1 to 4 carbon atoms, and
R and R' are, independently, hydrogen, fluoro, chloro, bromo alkyl of 1 to 4 carbon atoms or alkoxy of 1 to 4 carbon atoms.
2. A compound of claim 1 in which X is oxygen.
3. A compound of claim 1 in which X is sulfur.
4. A compound of claim 1 in which $R°$ is alkyl.
5. A compound of claim 1 in which R is hydrogen.
6. A compound of claim 3 in which $R°$ is alky.
7. A compound of claim 3 is which $R°$ is hydrogen.
8. The compound of claim 7 in which each of $R°$ and R' is hydrogen.
9. The compound of claim 3 in which $R°$ is ethyl.

* * * * *